United States Patent [19]

Lavelle, Jr.

[11] Patent Number: 4,976,010
[45] Date of Patent: Dec. 11, 1990

[54] METHOD FOR FISH CLEANING

[76] Inventor: Edwin F. Lavelle, Jr., 31 Diamond St., North Chelmsford, Mass. 01863

[21] Appl. No.: 387,065

[22] Filed: Jul. 28, 1989

[51] Int. Cl.$^5$ .............................................. A22C 25/18
[52] U.S. Cl. ................................................... 452/116
[58] Field of Search .............................. 17/51, 65, 58

[56] References Cited

U.S. PATENT DOCUMENTS 2,795,817  6/1957  Dahlberg .............................. 17/51
4,615,079 10/1986  Chartrand ............................ 17/58

OTHER PUBLICATIONS

Gibson, B., "The Hydro-Gutted Bait", *Saltwater Sportsman*, (Northeast Edition), Jul. 1990, p. 139.

*Primary Examiner*—Willis Little
*Attorney, Agent, or Firm*—Fish & Richardson

[57] ABSTRACT

The present invention is directed to a method and apparatus for the improved and more rapid cleaning of, or the removal of the viscera or the so-called "guts" of dead fish without the need for the cutting open of the fish in order to get into or have access to the body cavity of the fish. The device is typically attached to a common garden hose type of water nozzle and is inserted into the anus of the bait fish. With the application of water pressure the intestines/viscera are forced out of the mouth of the dead fish. No cutting and stitching is required and the fish is substantially not altered in appearance thus not affecting its usefulness as a bait fish.

1 Claim, 1 Drawing Sheet

METHOD FOR FISH CLEANING

BACKGROUND OF THE INVENTION

1. Field of the Invention

This invention most generally relates to the removal of the viscera or the insides of fish. More particularly this invention relates to a method and apparatus used to rapidly and completely remove the viscera/guts of fish without the need to cut open the body cavity.

2. Description of the Prior Art

Mackerel are used as bait when fishing for tuna. Along the New England coast, the mackerel are caught around the end of May and frozen until approximately the end of June when tuna are caught in the Massachusetts area. Prior to freezing the mackerel and, of course, prior to the use of them as bait fish, they must first be cut down the belly and gutted out. The belly must then be neatly sewn or stitched together again in order that they can be used as a bait fish for the tuna. These steps or operations are necessary whether or not the fish are subsequently frozen prior to their use as bait. This process takes about 3-5 minutes. Given that bait fish are used in very large quantities, it is obvious that considerable time is expended in the preparation of the bait fish. The time spent in the cutting of the belly, the gutting and the subsequent sewing-up of the fish adds considerably to the cost of the bait fish.

Obviously, it is important to thoroughly remove the fish's viscera. Anyone even remotely familiar with the problems associated with the proper cleaning of fish, such as the occasional angler, soon comes to the quick realization that even after a fish has been gutted, a certain amount of viscera will remain attached to the walls and crevices in the body cavity. Not only is this result unpleasant from an appearance standpoint, but more importantly this residue is particularly susceptible to spoilage that may ultimately taint the flesh of the fish.

With the instant method and device the time to gut the fish is reduced to about 20-30 seconds and the fish is thoroughly and completely gutted and free of body cavity residue. Also, important to the use of the fish as bait for tuna fishing is that the bait fish appears and behaves, in the water, as a live mackerel.

While the invention was developed for use with mackerel as bait for tuna fishing, it is important to note that the method and apparatus is effective to gut other types of fish, especially where it is advantageous not to cut open the fish to clean out the viscera.

There has been considerable development of devices for the scaling and the cleaning of fish. There is a teaching in the prior art of the notion of connecting a water source via a garden type hose to a tool or device and the combination used for the scaling of fish. U.S. Pat. Nos. 3,667,086 (06/06/72) to Sexton; 4,297,765 (11/03/81) to Altman et al: and 4,339,850 (07/20/82) to Altman et al are examples of fish cleaning apparatus connected to garden hoses. However, there is no mechanism, apparatus or method known to the inventor of the instant invention which can be used or is being used to remove the insides, viscera or "inerds" from a dead fish without the need to cut open the fish in order to access the body cavity. U.S. Pat. No. 4,615,079 issued 10/07/86 to Chartrand teaches a device connected to a hose for inserting into the fish's body cavity for cleaning purposes. However, Chartrand does not teach the insertion into the anal cavity and he does not suggest or teach the use of his device as an alternative to cutting open the fish in order to remove the viscera. The inventor of the instant invention teaches herein, the insertion of his device into the body cavity for the only purpose of forcing, with water under pressure, the body cavity materials out of the dead fish through the mouth.

It would be desirable to have a method and a device which could effectively and rapidly remove from dead fish the insides or the viscera without the need to cut open the body cavity of the fish. It would also be desirable to be able to gut bait fish such as mackerel rapidly and in a manner which does not alter the external appearance and character of the fish.

SUMMARY OF THE INVENTION

The present invention in it's most simple form or embodiment is directed to a method and apparatus for the improved and more rapid cleaning of, or the removal of the viscera or the so-called "guts" of dead fish without the need for the cutting open of the fish in order to get into or have access to the body cavity of the fish.

The device is typically attached to a common garden hose type of water nozzle and is inserted into the anus of the bait fish. With the application of water pressure the intestines/viscera are forced out of the mouth of the dead fish. No cutting and stitching is required and the fish is substantially not altered in appearance thus not affecting its usefulness as a bait fish.

This method and apparatus can be used with various sizes of fish and is not limited to gutting only bait fish. The fish gutting device can be made of any size appropriate for the size of fish that is being gutted.

The device more particularly comprises a nozzle portion and a portion adapted to be attachable to a pressurized water source such as for example a common garden hose. The nozzle portion is basically a hollow tube having a tip end of which is sized to be insertable into the anal cavity of a dead fish without damage to the flesh in the region proximate to the anus. The base end of the nozzle portion is adapted to be attached to, most typically, a fitting which in turn will attach to the male fitting end of an ordinary garden hose.

It is a primary object of the present invention to provide a fish gutting device comprising means for entering in a non-damaging manner, the body cavity of a fish through the anus of said fish, a means for providing pressurized water into said body cavity through the means for entering, a means for directing, by direction of the means for entering, flow of the pressurized water into the body cavity to dislodge and flush viscera out through the mouth of the fish, and a means for activating flow of the pressurized water. The means for entering comprises a nozzle portion and a base portion. The nozzle portion comprising a cylinder having a passage therethrough, a radiused tip end sized to be insertable into the anal cavity of the fish without damage to the flesh in the region proximate the anus and the means for providing pressurized water comprises a base portion adapted to be attachable to a pressurized water source, providing tight water communication with the means for providing pressurized water and a base end of the nozzle portion.

Another object of the present invention is to provide a fish gutting device which is attachable to an ordinary garden hose as a source of pressurized water, which water can be controlled by ordinary valving means typically used with garden hoses. The nozzle tip end has an aperture which directs the pressurized water toward the head end of the fish.

Yet another object of the present invention is to provide the fish gutting device with at least a front lateral flow directing means comprising at least one front lateral flow directing aperture configured to direct lateral flow at an angle of between about thirty degrees (30°) and about sixty degrees (60°) from the direction of the nozzle passage, wherein said at least one lateral front flow directing aperture is positioned from the tip end at a cross section of the nozzle portion at least about equal to the cross section dimension of the nozzle portion. A rear lateral flow directing means similar to the front lateral flow directing means may be located further back from the tip end of the nozzle and in back of the front lateral flow directing means and otherwise similarly configured to the front means. The fish gutting device may be made from material such as aluminum, brass, copper, steel, poly-vinyl-chloride, plastic, rubber, and wood or any other material which permits the penetration of the anal cavity and permits the introduction of pressurized water into the body cavity of the fish.

A still further object of the invention is to provide a method for the gutting of fish without cutting the fish in order to access the body cavity to remove the viscera. Such a method comprises in combination the steps of entering in a non-damaging manner, using a device such as that described herein the body cavity of a fish through the anus of said fish; providing pressurized water into said body cavity through the device; activating flow of said pressurized water; and directing, by direction of the device, flow of said pressurized water into said body cavity to dislodge and flush viscera out through the mouth of the dead fish.

These and further objects of the present invention will become apparant to those skilled in the art after a study of the present disclosure of the invention.

DESCRIPTION OF THE PREFERRED EMBODIMENTS

Figure 1:
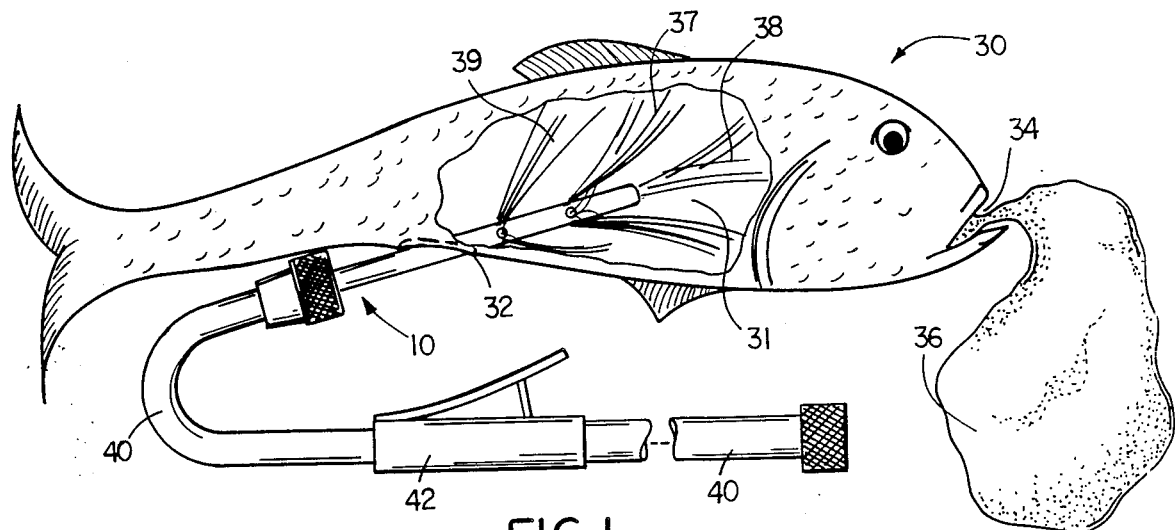
FIG. 1 is a perspective of the fish gutting device illustrating the use of the device.

The following is a description of the preferred embodiment of the invention. While the fish cleaning device is illustrated as being tubular with a round passage through the length, the device could have other geometries so long as the device provides for the pressurized water flow into the body cavity of the dead fish through non-damaging penetration of the anal cavity. It is obvious to one of ordinary skill in the relevant art, that the configuration of the apparatus as is shown in the drawing figures is not the only configuration that is effective in achieving the purpose and function of the instant invention. Clearly, the configuration of the front and the rear lateral flow directing means need not be as indicated. The holes or apertures drilled into and through the wall of the nozzle portion of the device need not all lie on a single circumferential or in one plane of cross section of the nozzle. The apertures could be staggered, there could be only one or in the preferred embodiment there could be four apertures drilled through the nozzle wall at an angle of between 30° and 60° but preferably about 45°. The diameter and the length of the nozzle portion depends to some extent upon the type and more upon the size of the fish that is being gutted.

The materials used to make the apparatus could be for example, steel, aluminum, plastic, wood or any other material which would provide the strength, rigidity and other characteristics necessary to achieve the intended purpose of the device. The preferred material is anadized aluminum. Additionally, other means different from the ordinary garden hose with the standard knurled fittings and water control means could be used so long as the mating fitting is connectable and the water supply can be controlled.

For the purpose of providing a clear illustration, the apparatus will be described primarily with regard to the configuration of the elements as is shown in the drawings-incorporated into or connected to a conventional type of garden hose as the means for providing the pressurized water.

FIG. 1 illustrates pictorially how the fish gutting device 10 is used. The dead fish 30 is illustrated with a portion of its body cut away so that the action of the pressurized water 38 from the tip end aperture 20 and the water 37 and 39 from the front and rear lateral flow directing means 22 and 24 respectively, can be illustrated. In the method of removing the viscera from the dead fish, the device 10 is inserted into the anal cavity 32 of the fish 30. Upon penetration and before the nozzle portion 12 is advanced very far into the body cavity 31, the pressurized water flow is activated by means 42. The device 10 is advanced into the body cavity 31 while water 37, 38 and 39 is flowing from apertures 22a, 20 and 24a respectively. The action of the pressurized water 38 causes the breaking of a membrane in the fish which separates the body cavity 31 from the head. When this membrane is broken the combination of the action of water 37, 38 and 39 acts to clean the viscera 36 from the body cavity 31 and force the viscera 36 out of the mouth 34 of the fish 30 in substantially a contiguous bundle or unit. The viscera unit 36 can then quickly and efficiently be removed and discarded.

Figure 2:
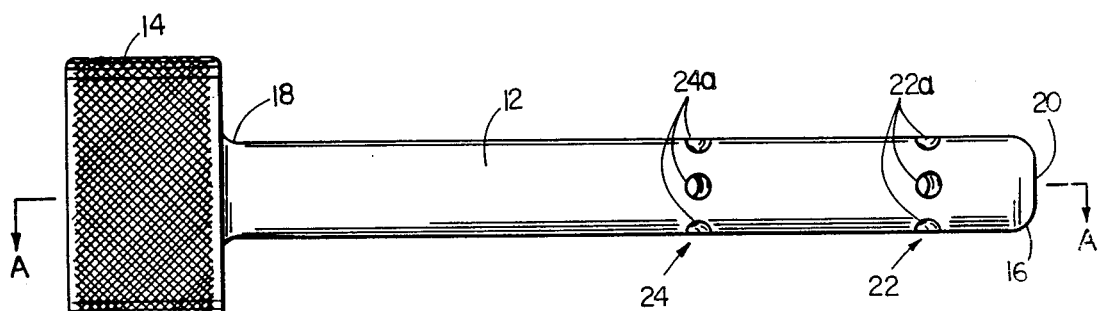
FIG. 2 is a plan view of the device showing the two sets of lateral flushing apertures or holes and the radiused tip end.
Figure 3:
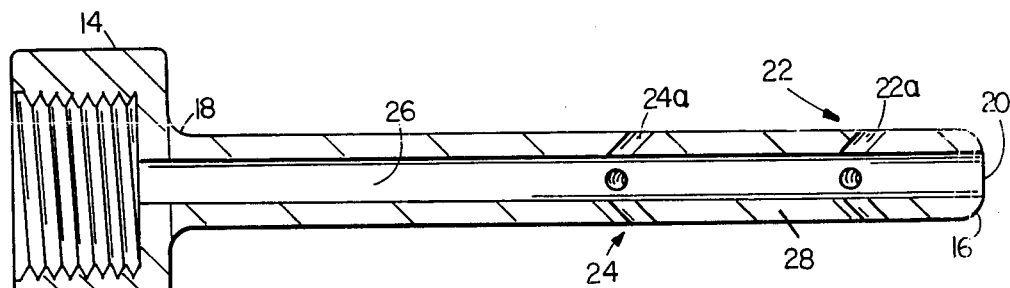
FIG. 3 is a cross section of the device as shown in FIG. 2.

As is shown in FIGS. 2 and 3, the preferred embodiment of device 10 is tubular. The nozzle portion passage 26 extends the length of the nozzle portion 12. The tip end 16 is radiused to permit easier and non-damaging penetration of the anal cavity 32. The tip end aperture 20 is the aperture from which the pressurized water 38 flows. The front and rear lateral flow directing means 22 and 24 respectively are preferably four (4) lateral flow directing apertures 22a and 24a which go through the nozzle wall 28 at an angle of about 45° so as to direct water 37 and 39 laterally and forward toward the mouth 34 of the fish 30. The base end 18 is securely attached to a base portion 14 in a manner which does not allow water to leak. The base portion 14 is preferably a knurled fitting which fits onto the male fitting end of an ordinary garden hose 40.

There is no other known equivalent method or device which provides the performance and the advantages obtained by the instant invention.

It is thought that the fish gutting device 10 of the present invention and many of its attendant advantages is understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. A method for gutting fish comprising the steps of: entering in a non-damaging manner, using a means for entering, the body cavity of a fish through the anus of said fish; providing pressurized water into said body cavity through said means for entering; activating flow of said pressurized water; and directing, by direction of said means for entering, flow of said pressurized water into said body cavity to dislodge and flush viscera out through the mouth of said fish.

* * * * *